No. 749,979. PATENTED JAN. 19, 1904.
W. H. BAKER & F. E. KIP.
WEFT REPLENISHING MECHANISM FOR LOOMS.
APPLICATION FILED JAN. 7, 1902.
NO MODEL. 6 SHEETS—SHEET 6.
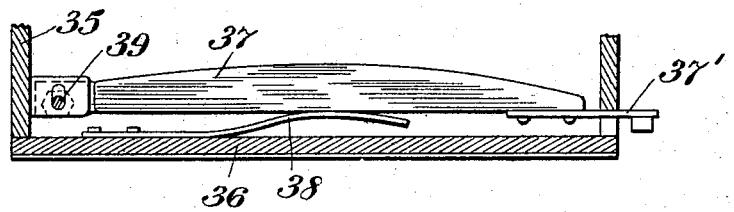
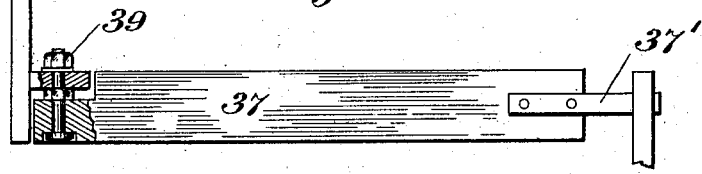
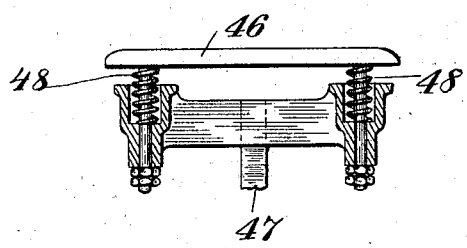
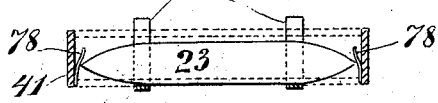

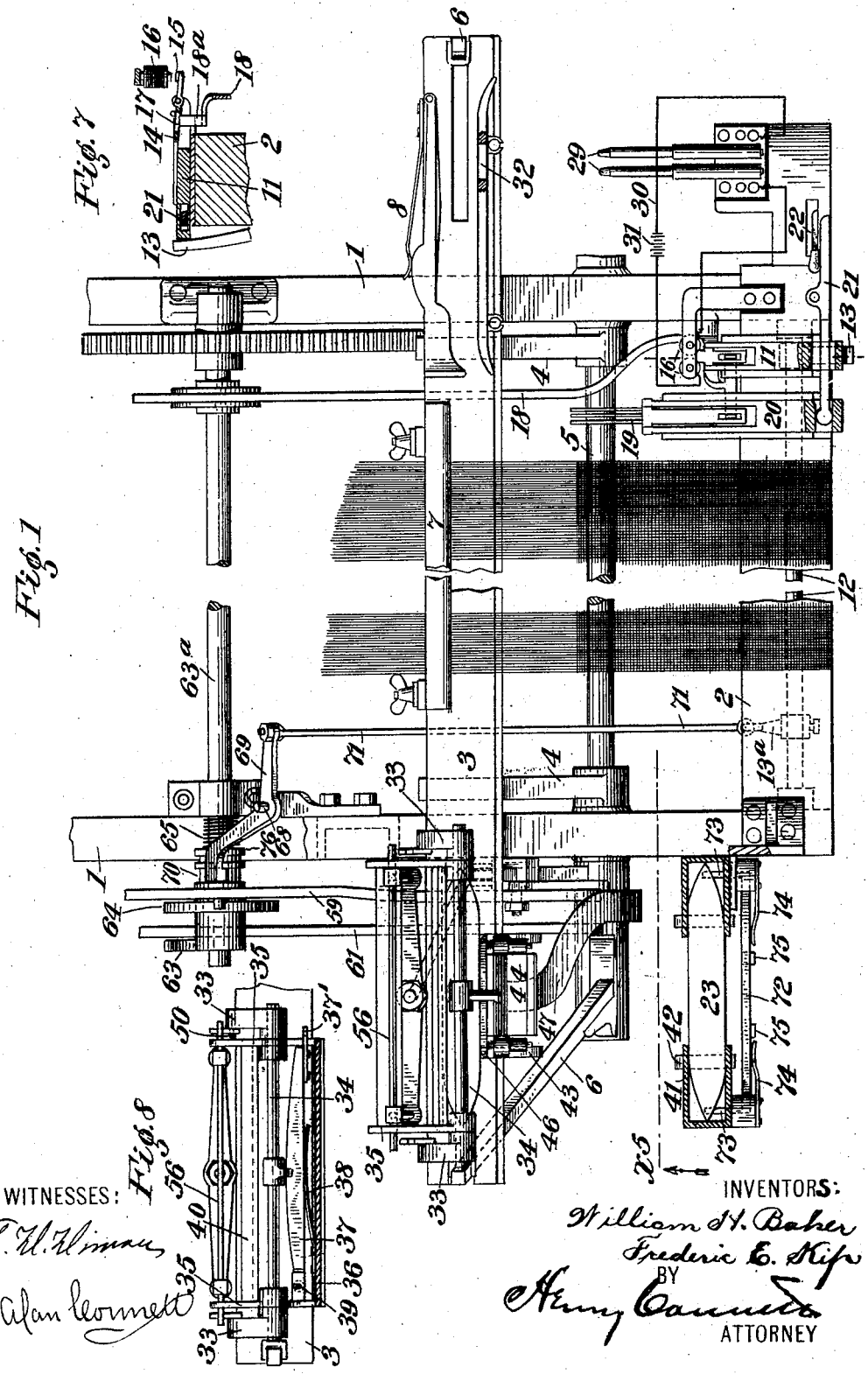

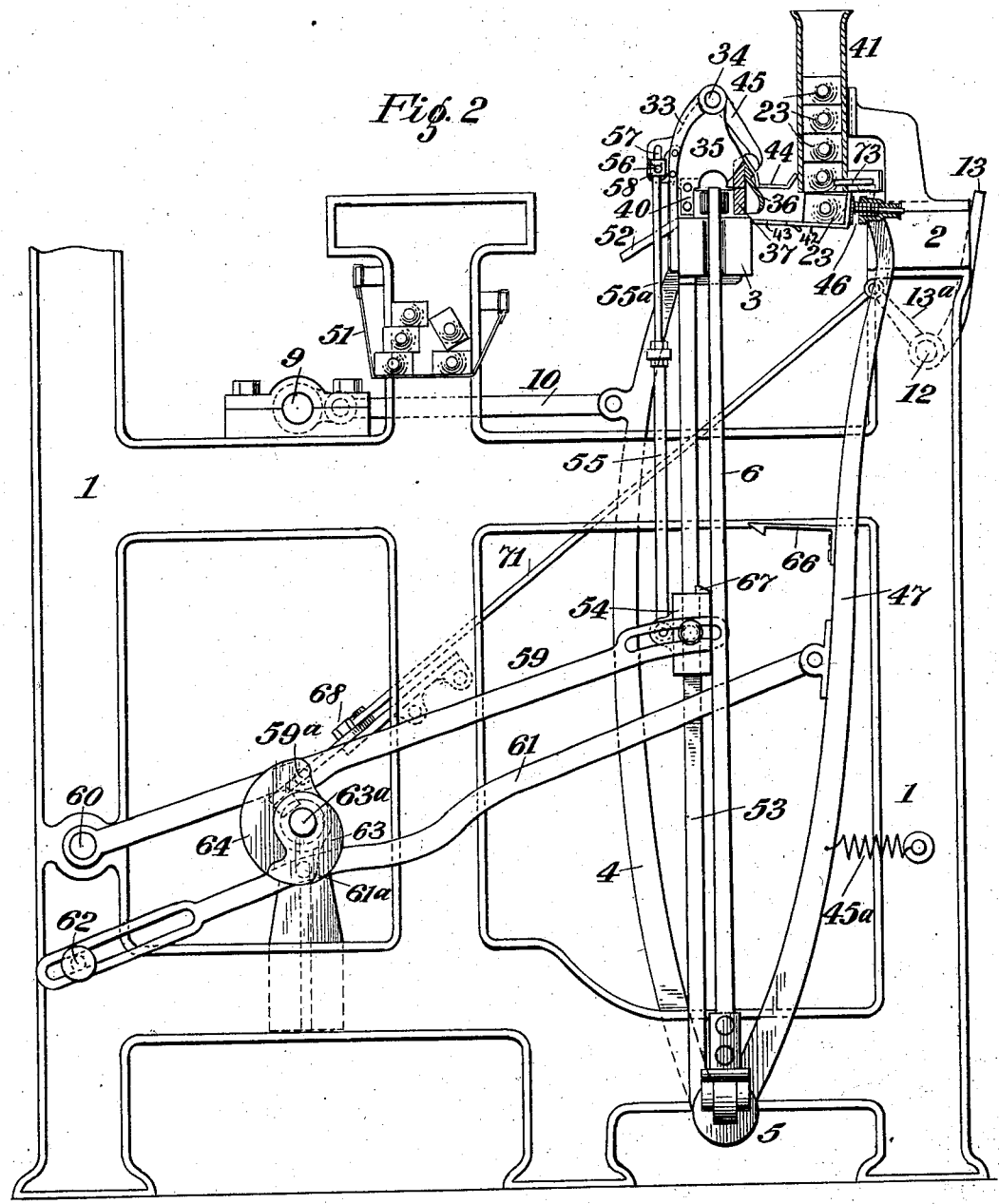

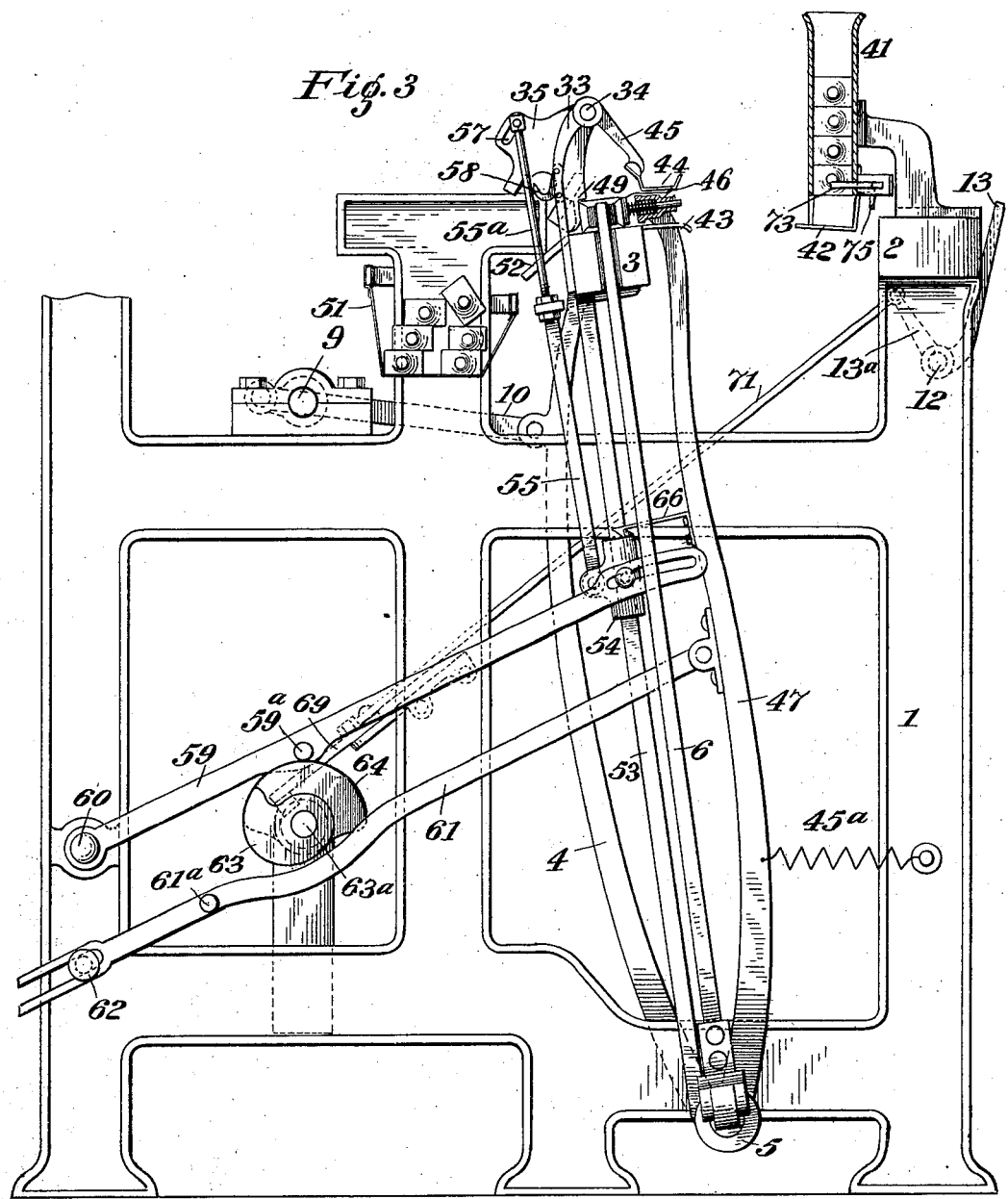

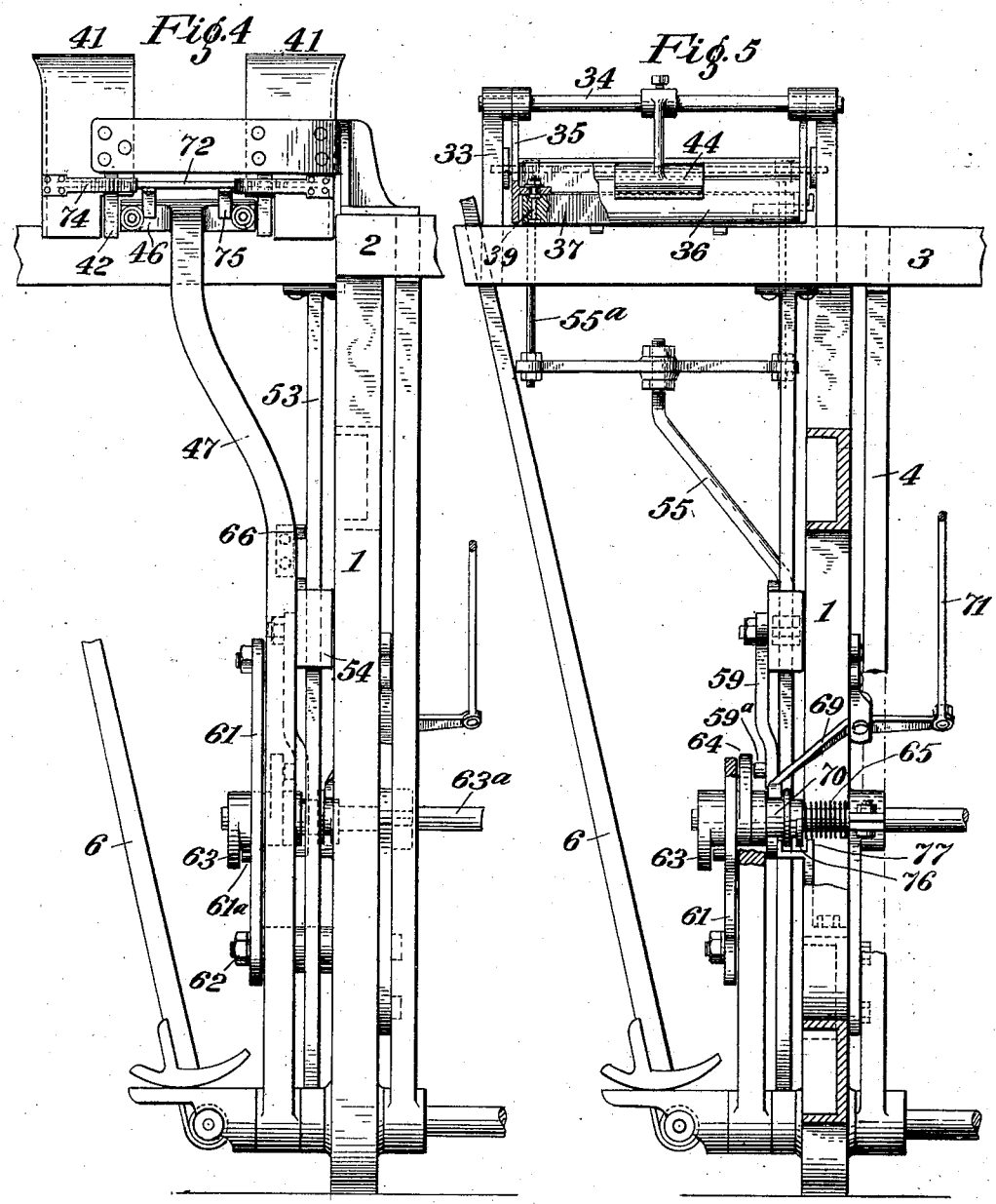

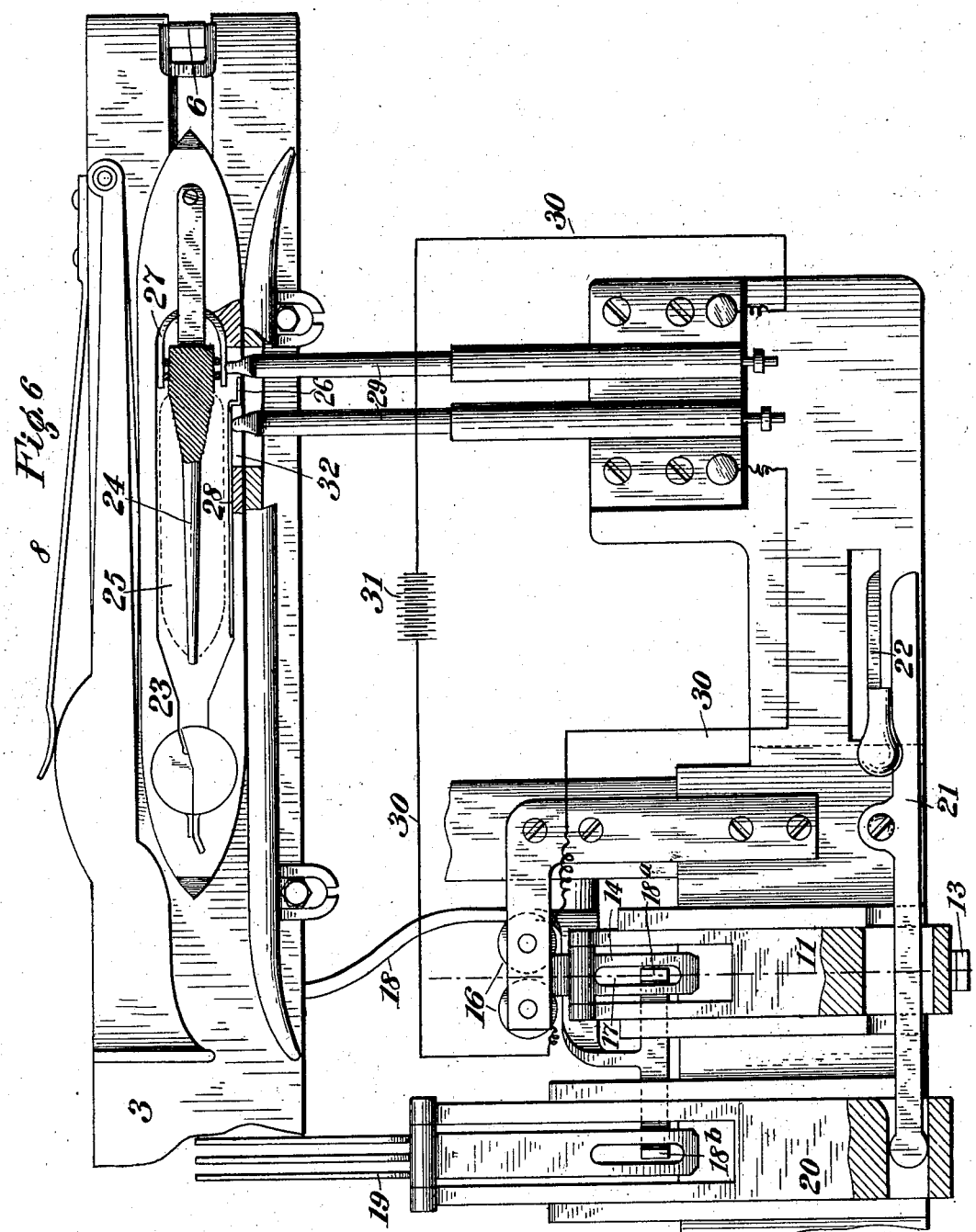

No. 749,979. Patented January 19, 1904.

UNITED STATES PATENT OFFICE.

WILLIAM H. BAKER, OF CENTRAL FALLS, RHODE ISLAND, AND FREDERIC E. KIP, OF MONTCLAIR, NEW JERSEY.

WEFT-REPLENISHING MECHANISM FOR LOOMS.

SPECIFICATION forming part of Letters Patent No. 749,979, dated January 19, 1904.

Application filed January 7, 1902. Serial No. 88,731. (No model.)

*To all whom it may concern:*

Be it known that we, WILLIAM H. BAKER, a resident of Central Falls, in the county of Providence and State of Rhode Island, and FREDERIC E. KIP, a resident of Montclair, in the county of Essex and State of New Jersey, have invented certain new and useful Improvements in Weft-Replenishing Mechanism for Looms, of which the following is a specification.

This invention relates to the class of looms wherein the weft or filling when nearly exhausted is replenished automatically by changing the shuttles and without stopping the loom. In this class of looms a detector mechanism is employed to determine the degree of exhaustion of the weft or filling in the running shuttle at frequent intervals, and this mechanism when the weft in the running shuttle becomes exhausted to a predetermined extent sets in operation the replenishing mechanism.

As our present invention relates to the weft-replenishing mechanism, we have employed electromechanical exhaustion-indicating devices substantially like those illustrated in our United States Patent No. 681,647, of August 27, 1901, for illustration.

This invention has for its object improved means for operating the shuttle-placer, an improved placer, improved means for supporting and guiding the shuttle on its way from the magazine to the lay, and improved means for displacing the shuttle-box.

All the novel features of the invention will be described in the following specification and carefully defined in the claims.

In the accompanying drawings, which illustrate an embodiment of the invention, Figure 1 is a plan of the front part of a loom embodying our invention. Figs. 2 and 3 are similar side elevations of the left-hand side of the part of the loom seen in Fig. 1, the former showing the parts in their normal position and the latter showing them in the position they assume when fresh weft or filling is being supplied. Fig. 4 is a front view of the part of the loom seen at the left in Fig. 1. Fig. 5 is a front view of the lay and other parts seen at the left in Fig. 1, the view being in substance a vertical section at line $x^b$ in Fig 1. Fig. 6 is a plan view on a larger scale than the principal views, showing the exhaustion-indicating means; and Fig. 7 is a section through the slide 11 seen in the plan in Fig. 1. Figs. 8, 9 and 10 illustrate details of the swell in the shuttle-box. Fig. 11 is a detail view of the cushion of the placer. Fig. 12 is an inner end view of the connected cams and their boss, showing the mutilated stop-flange. Fig. 13 is a horizontal sectional plan of the bottom portion of the magazine.

1 designates the loom-frame; 2, the breast-beam; 3, the lay; 4, the lay-swords; 5, the swing-rail; 6, the picker-sticks; 7, the reed, and 8 the shuttle-box at the right in Fig. 1 where the exhaustion-indicating devices are situated. 9 is the crank-shaft, from which the lay is vibrated through the medium of connecting-rods 10. All of these parts are common in some form in nearly all looms.

The detector mechanism or filling-exhaustion indicating mechanism which sets in operation the replenishing mechanism is best illustrated in Figs. 6 and 7. On the breast-beam is mounted a slide 11, which when moved forward by a vibrating part of the loom rocks a shaft 12 (seen in Figs. 1 and 3) through the medium of an arm 13 on said shaft. This slide 11 has mounted pivotally in it at its inner end an armature-lever 14, carrying an armature 15, situated opposite to the poles of an inverted electromagnet 16. The outer arm of the lever 14 has in it a slot or aperture 17, and normally the weight of the armature keeps this slotted arm of the lever elevated above a branch $18^a$ of the vibrating weft-hammer 18; but when the magnet 16 is excited and attracts its armature the slotted arm of the armature-lever is depressed into the path of the hammer-arm $18^a$, which engages the slot 17 and drives the slide 11 forward. It may be stated here that another branch $18^b$ of the weft-hammer acts under certain well-known conditions on the weft-fork 19 to drive forward the weft-fork slide 20 and through it and the knock-off lever 21 to set free the shipper-lever 22, and thus stop the loom. This is a well-known device on almost all looms. In order to excite the electromagnet 16 when the weft or filling in the running shuttle shall have been exhausted to a predetermined extent, the following described means may be employed: In the shuttle-box 8, as shown in in Fig. 6, is shuttle 23. In this shuttle is a bobbin 24 to carry the filling, the latter being designated 25 in Fig. 6. The bobbin is held in place by metal spring-jaws 27. In the front wall of the shuttle is a metal spring 28, the extremity 26 of which is adapted to be pressed into metallic contact with one of said jaws 27 when the weft or filling is denuded to a predetermined extent. The free end of this spring or movable part 28 is bent or otherwise set out of line with the body thereof, so as to be in position to effect contact properly with the jaw 27. 29 29 are the yielding terminals of an electric circuit 30, which includes the magnet 16 and a generator 31. When the shuttle is in the box 8 and the lay beats up, the terminals 29 enter coincident apertures at 32 in the box and shuttle. One terminal impinges on a jaw 27 and the other on the spring 28. If this occurs at a time when the filling in the shuttle is exhausted to the predetermined extent, the free end 26 of the spring 28 will be pressed into contact with the jaw 27, and this will complete the circuit through the magnet 16 and set the weft-replenishing mechanism in operation, owing to the rocking of the shaft 12, as will be hereinafter described. It will also be explained further that the terminals 29 are telescopic and contain springs, so that they may yield elastically when impinged upon.

The weft-replenishing mechanism will be now described.

Mounted on the lay (at the left in Fig. 1) are two brackets 33, in which is secured a bar 34. On this bar are mounted to swing two end plates 35, to which is rigidly secured at its ends a fixed front bar 36 of the shuttle-box at this side of the lay. Forming the real front side of this box is a swell 37, provided with a spring 38, Fig. 8. This swell is hinged at 39 (see Fig. 5) to a lug on the end plate 35 at that end of the box. The back wall or side 40 of the shuttle-box is rigidly fixed to the end plates 35.

41 is the magazine which contains the shuttle 23, the bottom of said magazine being open, so that the shuttles descend one by one and rest below the magazine on supports 42. These supports interlap when the lay beats up with similar supports 43 on the lay, these two sets of supports then forming a continuous slideway for the shuttle to move over from the magazine to the picking position on the lay. These supports are grid-like in form or made each with a plurality of projecting fingers 42 and 43, one side being offset from those of the other. When the lay beats up, as shown in Fig. 2, the fingers upon one of the supports will project into the spaces between the fingers on the other support to form a closed raceway. Fig. 3 shows these fingers in their disengaged position. The shuttle in moving over this slideway is kept down by a guard 44 above and carried by an arm 45, attached to the bar 34. The shuttle is moved over to the lay by a placer 46, carried by a placer-arm 47, hinged below and preferably on the swing-rail 5. To allow the placer to yield a little, it will be by preference provided with cushion-springs 48. These are best seen in Fig. 11. Simultaneously with the movement of the placer in placing a shuttle on the lay the shuttle-box opposite to the placer is swung back out of the way, so that when the fresh shuttle is placed the front bar 36 of the swinging box becomes the rear wall or side of the latter, having on its face an overhang 49, Fig. 3, which takes over the shuttle and insures the latter being kept down in place until picked. The placer forms at this time the front wall or side of the shuttle-box. It should be explained that at the moment of changing shuttles the exhausted shuttle in the box will be pressed up to the inner or back wall of the box by the swell 37; but when the box swings back a projecting arm 37' on the swell, Fig. 8, engages a stud 50, suitably placed on one of the brackets 33, and the swell is held back, so as to relieve the pinch on the shuttle, when the latter will be thrown out of the box and into a receptacle 51, the lay being provided, preferably, with an inclined way 52 to prevent the shuttle from falling back between the lay and the said receptacle.

The mechanism for operating the shuttle-box and placer will now be described.

Referring especially to Fig. 2, 53 is an upright guide hinged to the swing-rail 5 and extending up to the lay, and 54 is a slide on same. Hinged at its lower end to the slide is an operating-rod 55, which has forks or branches 55ª at its upper end. A cross-rod 56, secured to these branches, engages and plays in slots 57 in the end plates 35 of the shuttle-box. When the box is in its normal position on the lay, as in Fig. 2, the rod 56 rests in locking-notches 58 in or on the brackets 33 on the lay, so that the shuttle-box is locked against swinging. When the slide 54 is elevated, the first effect is to lift the cross-rod 56 out of the locking-notches, so as to free the shuttle-box; but when the said rod strikes the upper ends of the slots 57 it swings the box backward or inward to the position seen in Fig. 3, the rod 55 turning on the hinge-axis at the slide 54. The slide 54 is moved upward by an operating-lever 59, which is fulcrumed at 60 on the framework and has a slotted connection to the slide at its free end, as clearly shown. Simultaneously with the swinging of the shuttle-box, as last described, the placer 46 is made to move up to the lay and place the fresh shuttle thereon in the position seen in Fig. 3.

This movement is effected by a draw-bar 61, coupled at one end to the placer-arm 47 and having a slotted coupling connection at 62 to the loom-frame.

The means for operating the lever 59 and draw-bar 61 will now be described.

On a continuously-rotating cam-shaft 63ª are splined two connected cams 63 and 64, which are backed by a spring 65, which tends to keep them always pressed outward and in inoperative position. When pressed inward or into operative position, the cam 63, which is a hook-cam, in its rotation will engage a stud 61ª on the draw-bar 61 and through this bar draw the placer up to the lay. At the same time the cam 64 will take under a stud 59ª on the lever 59 and through this lever elevate the slide 54, thus swinging back the shuttle-box. These movements take place when the lay is beat up, and when the placer moves up to the lay a spring-latch 66 thereon engages a tooth or projection 67 on the slide, thus locking them together, so that when the lay moves back it will carry the placer back with it and move the stud 59ª out of engagement with the hook-cam 63. The concentric part of the cam 64 holds the slide 54 elevated until the fresh shuttle is picked, when the slide falls, thus replacing the shuttle and allowing the placer-spring 45ª to retract the placer. When the cams 63 and 64 are in their normal position pressed outward on the shaft by their spring, the lever 59 and draw-bar 61 and the studs thereon will be out of the paths of their respective cams; but at the proper time the cams are shifted into operative position by means now to be described.

Fulcrumed at 68 on the loom-frame is an elbow-lever 69, the nose of one arm of which, Fig. 1, engages an annular groove 70 on the common boss of the two cams 63 and 64, and the other arm of said lever is coupled by a rod 71 to an arm 13ª on the rock-shaft 12, which extends across the front of the loom. On this shaft, as before stated, is an arm 13, upon which impinges the slide 11 when the latter is driven forward. This slide rocks the shaft 12 and shifts the cams 63 and 64 into operative position.

It will be noted that the shuttles 23 in the magazine 41 rest or are superposed on each other, the lowermost one normally resting on the supports 42 below the bottom of the magazine and in front of the placer. When the placer moves this shuttle up to the lay over the trackway provided, the next shuttle above it is prevented from falling down, so as to impede the retracted placer, by a device seen best in Figs. 1 and 4. This device comprises a bar 72 with fingers 73 at its ends which project into the magazine and take under the respective ends of the shuttle next above the bottom one. The bar 72 is backed by springs 74 and has a pendent lug or lugs 75, which depend into the path of the placer, so that when the placer is retracted or moves to its position under the magazine it impinges on these lugs and presses back the supporting-fingers 73, thus permitting the shuttles in the magazine to descend.

When the cams 63 and 64 shall have been put in operative position by sliding their splined boss inward along the cam-shaft, it is necessary that they shall be retained in this position by a stop until they have done their work, and to effect this object the boss has on it a mutilated stop-flange 76. (Seen in face view in Fig. 12.) When the cams are shifted, their rotation causes this stop-flange to engage a fixed bracket 77 on the loom-frame, and this bracket stops the cams from being driven outward by the spring 65 until they shall have rotated far enough for the stop-flange 76 to clear the bracket 77.

Fig. 13 shows the lower part of the magazine in plan. The ends of the magazine depend below the sides, and on these are springs 78, which take in front of the ends of the shuttle resting on the supports 42 and keep it in place. These springs yield when the placer pushes the shuttle over the trackway or chute to the picking-point on the lay.

By the word "magazine" as herein employed is meant any holder for a spare shuttle or shuttles. A receptacle for a great number of shuttles is not essential to the invention. It will be noted that the supports 42 form such a holder for a spare shuttle, and in the construction shown they form a part of the magazine proper. The placer 46, it will be noted, does not take under the shuttle to be shifted, but behind it, as a pusher.

Our invention is not restricted to all of the specific details of construction shown and described herein. These may be modified without departing materially from the invention.

By "filling-holder" we mean any device to hold filling or weft adapted to go into a shuttle and commonly called a "bobbin," "cop," "skewer," &c. By "exhaustion" or "substantial exhaustion" of the filling and similar phrases we mean such degree of exhaustion thereof as will prevent imperfections in the fabric woven.

The self-threading shuttle and circuit-changing means herein shown may of course be used in any known form of weft-replenishing looms—such, for example, as that shown in United States Patent No. 633,976, of September 26, 1899.

Having thus described our invention, we claim—

1. In a weft-replenishing mechanism for looms, a weft-exhaustion-indicating mechanism, and means set in motion thereby for supplying full shuttles to the loom as required, said means comprising a swinging shuttle-box, means for swinging said box, a placer, means for operating said placer, a shuttle-magazine, a support below the magazine consisting of a plurality of projecting fingers, and coacting fingers on the lay adapted to project into the spaces between the fingers on said support when the lay beats up to form a closed raceway.

2. In a weft-replenishing mechanism for looms, the swinging shuttle-box, having a front bar provided on its front face with an overhang to take over the fresh shuttle when the box is swung back and said bar becomes the back of the box, means for swinging the shuttle-box, a placer for the fresh shuttle, means for operating the placer, and weft-exhaustion-indicating means for operating the shuttle-box and placer.

3. In a weft-replenishing mechanism for looms, the swinging shuttle-box, having a fixed front bar with an overhang and a swell and its spring independent of said front bar, in combination with a placer for the fresh shuttle.

4. In a weft-replenishing mechanism for looms, the combination with a placer for placing the fresh shuttle and means for operating the same, of a swinging shuttle-box having fixed front and back bars, a swell and its spring at the normal front of the box, said swell being behind and independent of the front bar, and means for relieving the elastic pressure of the swell on the exhausted shuttle when the box is swung back.

5. In a weft-replenishing mechanism for looms, the combination with a shuttle-box mounted to turn about an axis for displacement and having slotted end plates, of a cross-rod engaging said slots, an operating-rod coupled to said cross-rod at its upper end and hinged below to a slide, means for operating said slide, and means for locking the shuttle-box when in its normal position on the lay.

6. In a weft-replenishing mechanism for looms, the combination with a swinging shuttle-box provided with slots 57, and a cross-rod 56 engaging said slots, of the brackets, having locking-notches 58 in position to engage the rod 56 normally, an operating-rod 55, having forks or branches coupled to the cross-rod, and means for operating the rod 55, substantially as set forth.

7. In a weft-replenishing mechanism for looms, a shuttle-box displaceable by rocking or swinging about an axis, and mechanism for operating said box, comprising a normally rotating cam-shaft, a cam splined and slidable thereon into and out of operative position, mechanism for sliding said cam into its operative position, a weft-exhaustion-indicating means controlling the operation of said mechanism, and means between said cam and shuttle-box whereby the former, when in operative position actuates the latter, substantially as set forth.

8. In a weft-replenishing mechanism for looms, a vibratable placer and its arm, and mechanism for drawing said placer up to the lay, comprising a normally rotating cam-shaft, a hook-cam splined and slidable on said shaft, a draw-bar coupled to the arm of the placer and having a slotted bearing on the loom-frame, a stud in said bar, mechanism for sliding said cam into position to engage the stud on the bar, and a weft-exhaustion-indicating means controlling the operation of the last-named mechanism.

9. In a loom, the combination with a swinging shuttle-box, a placer adapted to transfer a full shuttle from a magazine to the lay, its arm, and the said magazine, of means for operating said shuttle-box and placer, said mechanism comprising the cam-shaft, the connected cams 63 and 64 splined and slidable on said shaft, the spring behind said cams, the draw-bar 61 and its stud, said draw-bar being coupled to the placer-arm and slidably coupled to the loom-frame, the slide 54 and its guide, the lever 59 and its stud, said lever being fulcrumed on the frame and slidably coupled to the said slide, the branched operating-rod 55, hinged to the slide 54 and coupled through its branches to a cross-rod 56, engaging slots in the ends of the shuttle-box, the spring-latch 66 on the placer-arm, and adapted to engage a tooth on the slide, and means for sliding said connected cams on the cam-shaft, substantially as set forth.

10. In a weft-replenishing mechanism for looms, a weft-exhaustion-indicating mechanism, and means set in motion thereby for automatically supplying weft or filling, said means comprising a swinging shuttle-box, means for swinging said box, a shuttle-placer which forms the front of the shutttle-box for the first pick, means for operating said placer, and means for forming, at the supplying period a shuttle guide or chute level with the raceway, said chute having a top and bottom guide from the magazine to the raceway for properly guiding the shuttle in its movement from the magazine or holder to the picking-point.

11. In a loom, weft or filling replenishing means, including a shuttle-box, a magazine, a transferring or shifting placer and actuating means therefor, in combination with a shuttle chute or slideway which is, at the time of the transfer of a shuttle, level with the raceway and practically continuous from the lay to the magazine.

12. In a loom the combination with weft or filling replenishing means including a shiftable shuttle-box, a holder for the spare shuttle, a pushing-placer, means for operating the said box and placer, of a continuous raceway or chute for the placer, a part of said raceway being stationary and consisting of a plurality of projecting fingers, and a part vibrating in unison with the lay and consisting of fingers offset from those of the stationary part, said fingers being adapted to interlap when the lay beats up.

13. In a loom, the combination with the vibrating lay, and a weft or filling replenishing means including a shiftable shuttle-box, a holder for the spare shuttle, a placer, and means for operating said box and placer, of a top guide which vibrates with the lay and takes over the spare shuttle in its movement from said holder to the lay at the time of the transfer of said shuttle and the interlapping two-part trackway.

14. In a loom the combination with the vibrating lay, of a weft or filling replenishing mechanism which includes a magazine, a shuttle-box on the lay, a raceway for the spare shuttle on its way from the magazine to the lay, said raceway consisting of a plurality of fixed projecting fingers, corresponding fingers secured to the lay adapted to interlap with the fixed fingers when the lay beats up, and a pushing-placer which takes behind the spare shuttle supported on said raceway, and means for operating said placer.

15. In a weft or filling replenishing mechanism for looms, a vibrating placer device comprising a carrying-arm, a head to take behind the spare shuttle, and coiled springs behind said head, said springs occupying sockets, substantially as and for the purpose set forth.

16. In a weft-replenishing mechanism for looms, the combination with the magazine, the lay, a trackway between the magazine and lay and independent of the shuttle-box, to support the full shuttle in its movement from former to the latter, of the displaceable shuttle-box having a swell in its side adjacent to the magazine.

17. In a weft-replenishing mechanism for looms, the combination with the normally rotating cam-shaft, the connected cams 63 and 64 splined and slidable on said shaft, the spring which holds said cams normally in inoperative position, means for sliding the cams into operative position, and means for holding said cams in operative position during a portion of their revolution, of the swinging shuttle-box, the magazine, the placer, and means between the said box and placer for operating the latter.

18. In a loom, the combination with an electric circuit including a magnet responsive to a change in the circuit, circuit-changing means consisting of a shuttle having a metal jaw or holding device inside the shuttle to hold the filling-holder, a movable piece connected with and inside the shuttle and a two-pole feeler one pole adapted to impinge on the said jaw and the other on said movable piece to thereby change the circuit when sufficient exhaustion of filling permits thereof.

19. In a loom, the combination with an electric circuit including a magnet responsive to a change in the circuit, circuit-changing means consisting of a shuttle having a metal jaw or holding device in its interior to grip and hold the filling-holder, a movable piece in the shuttle one end thereof adapted to overlap the said jaw, terminals of the circuit sustained exterior of the shuttle, and adapted to coöperate, when sufficient exhaustion of filling in the shuttle permits thereof, with the circuit-changing means in the shuttle to thereby change the circuit.

20. In a weft-replenishing mechanism for looms, the combination with the vibrating lay, a shuttle-box thereon, and a feeler device, of a shuttle having a U-shaped metal gripping-jaw 27 to grip and hold a filling-holder, a movable metal piece which is adapted to be pressed into contact with said jaw by one pole of the feeler, said shuttle having in it an aperture to afford access for the feeler to said jaw and movable piece for effecting electrical contact.

21. In a weft-replenishing mechanism for looms, the combination with the vibrating lay, a shuttle-box thereon, and a feeler device, of a shuttle having mounted in it a metal jaw which embraces and holds a filling-holder, and a metal contact-piece attached to the shuttle with its free end extending toward and overlapping said jaw, said shuttle having an aperture in its side for the entry of the feelers to impinge respectively on said jaw and contact-piece, whereby electrical communication may be established between said contact-piece and jaw.

In witness whereof we have hereunto signed our names, this 3d day of January, 1902, in the presence of two subscribing witnesses.

WILLIAM H. BAKER.
FREDERIC E. KIP.

Witnesses:
PETER A. ROSS,
HENRY CONNETT.